United States Patent [19]
Otto, Jr., deceased et al.

[11] 3,924,165
[45] Dec. 2, 1975

[54] CONTROL CIRCUIT FOR SEQUENTIAL ENERGIZATION OF PLURAL LOADS FROM AN AC POWER SOURCE

[76] Inventors: Carl L. Otto, Jr., deceased, late of Lummi Island, Wash., by Phyllis Lockwood, executrix, Lummi Island, Wash. 98262

[22] Filed: May 10, 1974

[21] Appl. No.: 468,906

Related U.S. Application Data

[63] Continuation-in-part of Ser. No. 227,075, Feb. 17, 1972, Pat. No. 3,824,852.

[52] U.S. Cl. ...................... 318/132; 310/30; 307/41
[51] Int. Cl.² ........................................ H02K 33/00
[58] Field of Search.......................... 307/30, 38, 41; 310/30–35; 318/37, 126, 129, 132, 133, 130

[56] References Cited
UNITED STATES PATENTS

| | | | |
|---|---|---|---|
| 3,134,938 | 5/1964 | Morgan | 310/30 X |
| 3,316,470 | 4/1967 | Scott | 318/130 |
| 3,400,316 | 9/1968 | Kuschel | 318/129 X |
| 3,432,678 | 3/1969 | Larson | 307/38 |

*Primary Examiner*—R. N. Envall, Jr.

[57] ABSTRACT

Control circuitry for solenoid type power units and the like, such as employed as pump means in oceanographic monitoring apparatus and the like. In an illustrative embodiment two power units oscillate 90° out of phase through two sets of two solenoids, one set for each power unit, with distribution of successive half waves of the alternating current power being supplied to the solenoids in sequence. Each solenoid is energized through an electronic valve (e.g., an SCR) receiving gated power through another solenoid, the gating being through a capacitor and diode whereby the capacitor is initially rapidly charged and then discharges slowly enough to prevent or block regating until occurrence of a subsequent half wave, the blocking action being reinforced by the voltage drop occurring across the other solenoid, which in the meanwhile has been preferentially gated. A series connected capacitive means optionally provides series resonance with the mean net effective inductance of the solenoids to optimize power efficiency.

11 Claims, 4 Drawing Figures

CONTROL CIRCUIT FOR SEQUENTIAL ENERGIZATION OF PLURAL LOADS FROM AN AC POWER SOURCE

CROSS-REFERENCE TO RELATED APPLICATION

This application is a continuation-in-part of my application Ser. No. 227,075, entitled Electrical Powered Submerged Pump, Power Circuit Therefor, and Oceanographic Monitoring Apparatus and Method Employing Same, filed Feb. 17, 1972 now U.S. Pat. No. 3,824,852.

BACKGROUND OF THE INVENTION

A. Field of the Invention

This invention relates to circuitry for sequential energization of plural loads such as solenoid type pump units from an AC power source.

B. Description of the Prior Art

Known prior art includes the patents set forth in my aforesaid application Ser. No. 227,075, which includes, specifically with reference to circuits for electrical energization of pumps and various further examples of more or less related control circuitry, the following:

|  | U.S. Patent |
| --- | --- |
| Mesh | 2,630,345 |
| Vasilewsky | 2,690,128 |
| Morgan | 3,134,938 |
| Wertheimer | 3,381,616 |
| Rouquette | 3,556,684 |
| Fry | 3,129,336 |
| Scott | 3,316,470 |
| Kuschel | 3,400,316 |

SUMMARY OF THE INVENTION

The present invention relates to control circuitry for sequentially energizing a plurality of loads from an alternating current power source. Applications of such a control circuit are more fully disclosed in my aforesaid prior application 227,075, principally with particular reference to energization of a plurality of reciprocating pumps operated in sequence to supply a substantially constant stream of sample liquid to the monitoring section of an oceanographic monitoring apparatus and to provide cyclical movements at the surface of the apparatus relative to the ambient liquid medium to minimize attachment of matter, such as marine organisms, thereto. In the preferred embodiment, a pair of pumps are arranged oppositely with respect to the inertial mass and are connected thereto so as to operate out of phase, with the result that the alternating action of the pumps cooperatively augments the reacting force of the inertial mass. By arranging two such inertial masses on opposite sides of the unit, with each mass operating a respective pair of oppositely positioned pumps, and with the inertial masses operating approximately 90° out of phase with one another, the four pumps are caused to operate sequentially, and the inertial masses alternatively impart rotational and lateral vectorial components of movement to the unit.

In accordance with the present invention, the circuitry to accomplish this last named function is arranged to distribute successive half-waves of an alternating current supply sequentially through a plurality of actuators for the inertial units. This circuitry comprises a plurality of electronic check valves, each being connected in series with a respective load or actuator so as to pass current only during respective positive or negative half cycles of the alternating current electrical power supplied to the unit. There is an equal number of gating means, each being connected to gate a respective check valve of one actuator and being connected to another of said actuators so as to receive its gating power therefrom. There is also for each gating means a gating delay means, suitably comprising a capacitor and resistor in parallel and a diode in series therewith, the delay means functioning to delay or block operation of a given gating means on the previous cycle. This is accomplished by discharging a charged capacitor at a rate slow enough to block regating until the arrival of a like subsequent half-wave of power current, and reinforcing the blockage by means of the voltage drop across the other actuator which has been preferentially gated by reason of the unblockage of its gating circuit.

DESCRIPTION OF THE PREFERRED EMBODIMENT

Figure 1:
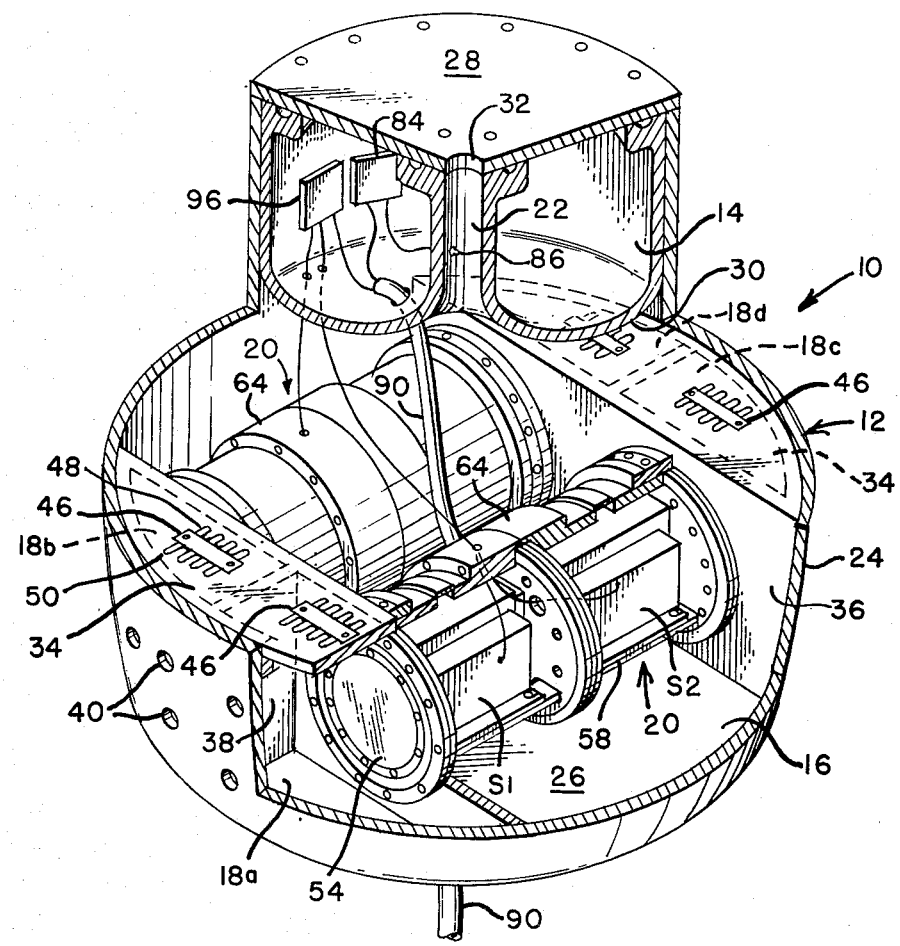
FIG. 1 is an isometric view of an oceanographic monitoring unit incorporating control circuitry typical of the present invention, with portions thereof cut away.
Figure 2:
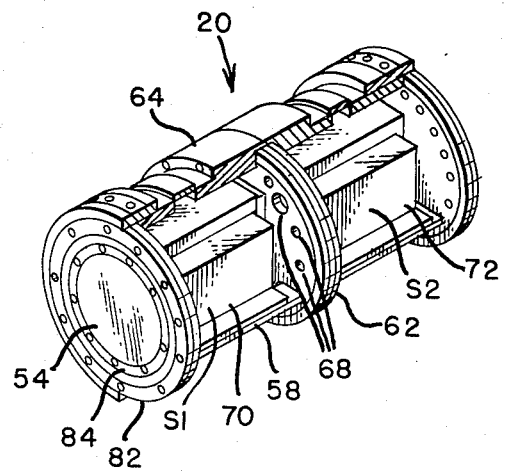
FIG. 2 is an isometric view of one of the power units of the unit shown in FIG. 1.
Figure 3:
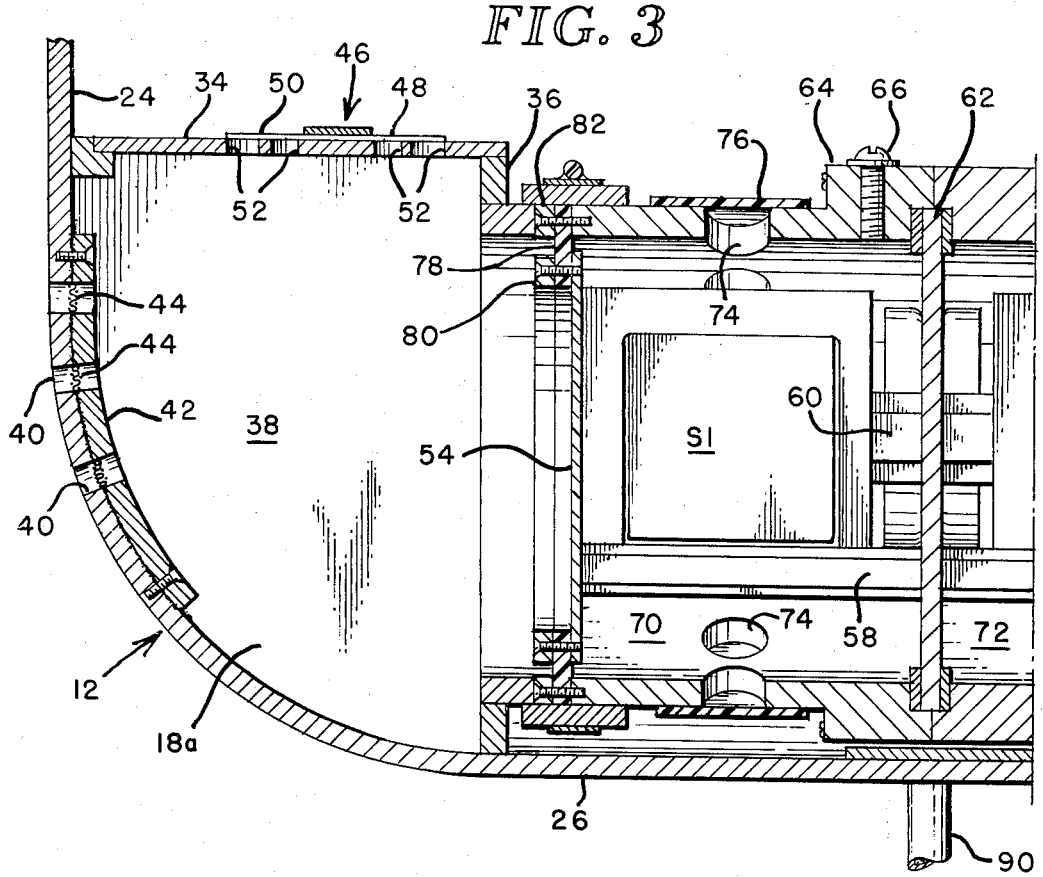
FIG. 3 is a vertical sectional view taken through the lower forward portion of the unit shown in FIG. 1.

The oceanographic monitoring unit 10 comprises a shell-like housing 12 which has therein an upper toroidal float chamber 14, a main water collecting chamber 16 and four pumping chambers 18a, 18b, 18c and 18d, respectively arranged in two sets spaced oppositely from one another in the lower portion of the housing 12. In the lower portion of the chamber 16 are two power units 20 which perform three main functions. The first such function is the supply of power to cause water to be pumped through the pumping chambers 18 into the main collecting chamber 16 and out through an upper outlet passageway 22 located in the center of the toroidal float chamber 14 so as to provide sample water by which the monitoring function is accomplished. The second function is the provision for constant flushing of screened inlet openings (to be described hereinafter) through which sample water is taken into the pumping chambers 18. The third function is the cyclic vibration of the entire unit 10 in a manner to minimize attachment of material such as marine organisms thereto.

The housing 10 comprises a cylindrical side wall 24, a bottom wall 26 formed integrally therewith, and a removable circular cover 28, with the external surface of the housing 12 being substantially a surface of revolution about a vertical center axis. The float chamber 14 is defined by a cover 28 and a generally toroidal wall 30 having a substantially U-shaped cross section. The cover 28 has a center hole 32 enabling outflow of water through the aforementioned outlet passageway 22. One set of adjacent pumping chambers 18a and 18b is formed by a respective horizontal top wall 34 shaped as a segment of a circle, a vertical side wall 36, a partition wall 38 separating the two chambers 18a and 18b, and an adjacent portion of the housing 12. The two other pumping chambers 18c and 18d are formed by like walls on the opposite side of the housing 12.

Inlet openings for each of the pumping chambers 18 are formed as a plurality of screened apertures 40 in the housing 12. These apertures 40 are conveniently formed by providing a patch 42 closely fitted and fastened to the interior surface of the housing 12. Holes are drilled through the assembled outer housing 12 and patch 42. The patch is then removed and replaced, with a fine screen 44 inserted between the outer housing 12 and patch 42.

Each of the pumping chambers 18a, 18b, 18c, 18d has as an outlet a check valve 46 formed in its related top wall 34. In the particular configuration shown herein each such valve 46 comprises a comb-shaped leaf spring 48, having a plurality of fingers 50 fitting over holes 52 in the top wall 34. These fingers 50 are sufficiently light and flexible to allow the escape of the required amount of water through the valve holes or openings 52.

Each pumping chamber 18 comprises a stiff pumping diaphragm or piston 54 located in the related pumping chamber side wall 36. Each pair of oppositely disposed pumping diaphragms 54 is actuated by a respective one of the two aforementioned power units 20. Each power unit 20 comprises a pair of solenoids, S1 and S2 being one set and S3 and S4 being the other, with S3 and S4 being shown only in FIG. 4. Each solenoid is attached to a respective diaphragm 54. Each solenoid pair (i.e., S1 and S2 on the one hand and S3 and S4 on the other hand) is arranged in line and each pair is joined rigidly to one another by rails 58 so that the diaphragms 54 of opposing pumping chambers (18a and 18c being one opposed set and 18b and 18d being the other) are by these means tied together, with one pumping chamber 18a or 18b, respectively, having positive displacement while its opposing pumping chamber 18c or 18d, respectively, has negative displacement. The plungers 60 of the solenoids S1 through S4 are fixed to the housing 10 by being fastened to a center plate 62 which is rigidly connected to the power unit housing 64, which is in turn fixedly attached to the main housing 12 through the pump housing side wall 36.

As will be disclosed more fully hereinafter, the power units 20 cause cyclical movement or vibration of the unit 10. In order to increase the total moving mass which causes the vibration, each of the housings 64 is filled with oil, a fill plug 66 being conveniently provided for this purpose. Holes 68 are provided in the center plate 62 that partitions the housing 64 to provide for the passage of oil from one chamber 70 to the other chamber 72 in the housing 64 of each of the power units 20. Also holes 74 are placed in the side wall of the housing 64 and sealed with a flexible band of material 76, partly for purpose of expansion relief and partly to facilitate the exchange of displaced fluid.

Each of the diaphragms 54 is rigid and acts like the head of a piston having an amplitude of stroke, typically, of one millimeter. Flexibility sufficient to permit this motion is provided by a flexible washer 78 which is attached to the diaphragm 54 by means of a clamping ring 80 and to the housing 64 by a clamping ring 82.

Mounted within the float chamber 14, so as to be in a protected and dry location, is a sensory circuit block 84 which can be considered the "payload" of the unit 10. While only one such block 84 is shown herein, there could be other such blocks in the chamber 14. The block 84 is provided with a sensor 86 which projects into the stream of sample fluid passing through the passageway 22. The sensor 86 is connected to its associated block 84 by means of a wire passing through a sealed aperture in the wall 30.

Power cable 90 delivers input power for the unit 10 and also provides outlet leads for the one or more sensory circuit blocks 84. The cable 90 suitably enters the unit 10 through an aperture located in the center of the bottom wall 26 of the housing 12. Typically, the unit 10 has a net excess of buoyancy and in such case the cable 90 also acts as a tether securing the unit 10 to an anchoring unit (not shown). Such an anchoring unit may contain heavy components such as a transformer (to be described hereinafter with reference to FIG. 4) and possibly a motor for reeling out and reeling in cable 90 to raise and lower the monitoring unit 10. The aperture for the cable 90 need not be sealed because the main chamber 16 of the housing 12 contains the same fluid as found outside the housing 12, and at substantially the same pressure.

The cable 90 passes upwardly through the center of the main chamber 16 and enters the float chamber 14 through a sealed aperture in the toroidal wall 30. The various wires of this cable 90 then connect to the one or more sensory blocks 84 and to another circuit block 96 by which the four solenoids S1 through S4 are sequentially activated (as will be described hereinafter with reference to FIG. 4).

In disclosing the operation of the monitoring unit 10, the following description is directed to the pumping and flushing action of a single pumping chamber 18 and its associated components, these comprising a single pumping unit. The description is then directed to the action of the power units 20 and the sequencing of such action, which action is the source of movement of the inertial masses in the unit 10 to cause its vibration so as to minimize attachment of marine organisms to the unit. The circuitry by which the four solenoids S1 through S4 are sequentially activated to cause such sequential action is then described.

A single pumping unit comprises a single pumping chamber 18, with its respective inlet apertures 40, outlet valve 46, pumping diaphragm 54 and its related solenoid S1, S2, S3 or S4. On the "intake" stroke (i.e., suction stroke) of the diaphragm 54, ambient water is drawn into the chamber 18 through the inlet openings 40, with the valve 46 remaining closed because of the negative pressure causing the leaf spring 48 to close the valve holes 52. On the "exhaust" stroke (i.e., pressure stroke) of the diaphragm 54, water in the chamber 18 is pushed back out through the inlet apertures 40 so as to flush the screens 44 in the apertures 40. The screened apertures 40 are proportioned, in terms of their total area and of the pore size of the screens, so as to offer sufficient resistance to passage of water therethrough to retain pressure within the chamber 18 for lifting the leaf spring of the valve 46 and cause some of the water in the chamber 18 to pass through the valve 46 into the main collecting chamber 16. Typically, about 90% of the water discharged from the chamber 18 passes back through the apertures 40 while the remaining 10% passes through the valve 46 into the main chamber 16 and serves as the sample fluid to be monitored.

To describe the action of the power units 20 with respect to the other components of the unit 10, it is first to be noted that each pair of solenoids S1, S2 and S3, S4 in a respective one of the power units 20 is positioned in line with one another and oscillates along the same axis. This axis of oscillation is offset from the vertical center axis of the unit 10, and is in a plane perpendicular to the vertical center axis of the unit 10, so that there is a cyclical movement of each connected set of solenoids, such movement having a substantial vectorial component of acceleration offset from the vertical center axis of the unit 10, which is also the vertical center axis of the housing 12. Further, since the two connected solenoids in a single power unit 20 are fixedly connected one to another by rails 58, the two diaphragms 54 of one power unit 20 (being positioned oppositely with respect to one another) move together, with one diaphragm 54 having positive displacement on its pressure stroke, while the opposing diaphragm 54 at the same time has negative displacement on its suction stroke.

During one stroke of a given pair of connected solenoids S1, S2 or S3, S4, the associated diaphragms 54 cause a lateral movement of the fluid in the power housing 64 in the same direction as the solenoids. Likewise, a portion of the water mass in one chamber 18a or 18b is pushed outwardly through the apertures 40 while a portion of the water mass is drawn into its respective opposing chamber 18c or 18d, with the water in these two chambers moving in the same direction as their related solenoids. Thus the total inertial mass causing vibration of the unit 10 on a given stroke is the solenoid pair S1, S2 or the pair S3, S4 (along with any structure attached thereto), the fluid in the housing 64, and the water in its respective pair of opposed chambers 18a, 18c or 18b, 18d.

Solenoids S1 through S4 are activated in the following sequence: S1, S3, S2, S4, and so continuously. Thus, there is first a movement of the interconnected solenoids S1, S2 to the left (with reference to the view in FIG. 1), then a movement of the interconnected solenoids S3, S4 to the left also, then a movement of the interconnected solenoids S1, S2 to the right, followed by a movement of solenoids S3, S4 to the right with this sequence being repeated continuously. Since the total inertial mass associated with each interconnected solenoid pair S1–S2, or S3–S4, is offset from the vertical center axis of the unit 10, and since the vertical center axis of the unit 10 is substantially coincident with the center of inertia of the unit 10, the movement of each interconnected set of solenoids (having a substantial vectorial component of acceleration spaced from the center of inertia of the unit 10) causes a net reaction which is a combination of rotational movement of the unit 10 as well as a lateral or translating movement. Thus there is a movement vector perpendicular to the housing surface and a movement vector parallel to the housing surface. The effect of this rotational and lateral vibrating action of the unit 10 is to produce both momentary pressure changes and movement in shear with respect to the surrounding liquid, at a frequency (e.g., 30 Hz) minimizing the adherence of small marine organisms to the unit 10.

Figure 4:
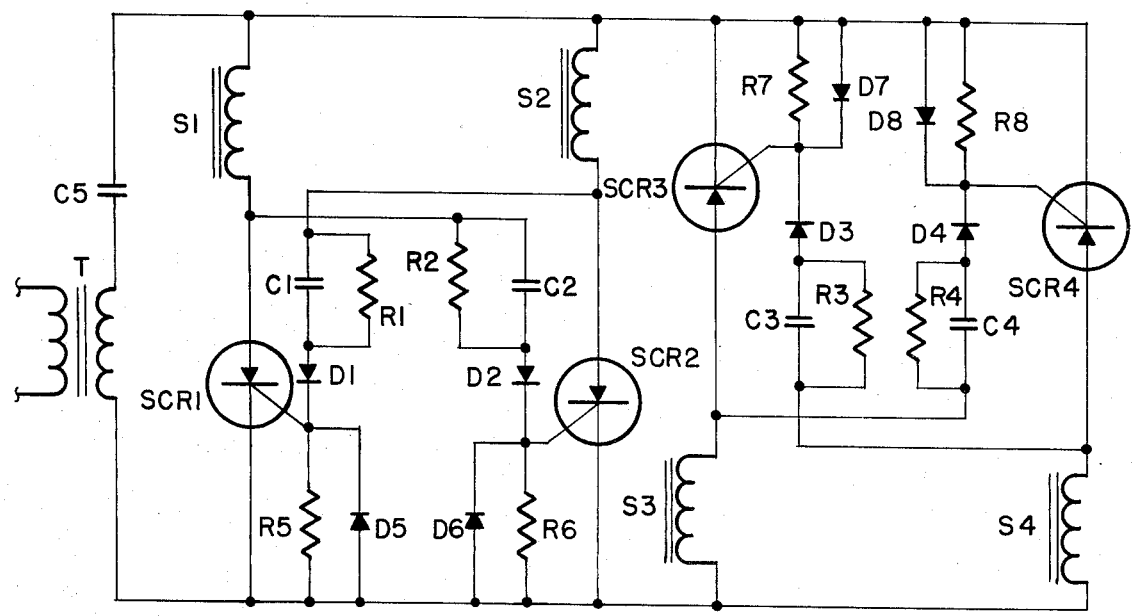
FIG. 4 is a diagram of the power and control circuitry employed in the unit shown in FIG. 1.

The circuitry by which sequential activation of the four solenoids 56 is accomplished is shown in FIG. 4. Transformer T serves as a source of alternating current power (at 60 Hz for example) for actuation of the solenoids S1–S4. Solenoids S1 and S2 are connected to a first side of the transformer T through a capacitor C5, and are each connected to the second side of the transformer in series with a respective one of two electronic valve devices, suitably silicon-controlled rectifiers SCR1 and SCR2. Solenoids S1 and S2 are thus energized only during the positive half cycles of the AC voltage across the secondary of transformer T.

Solenoid S1 is connected through parallel connected capacitor C2 and resistor R2 and series connected diode D2 to trigger the gating means of the silicon-controlled rectifier SCR2 in series with the other solenoid S2. Likewise, the solenoid S2 is connected through parallel connected capacitor C1 and resistor R1 and series connected diode D1 to trigger the gating means of the silicon-controlled rectifier SCR1.

The solenoids S3 and S4 are connected directly to the second side of the transformer T and are connected through respective silicon-controlled rectifiers SCR3 and SCR4 and capacitor C5 to the first side of the secondary of transformer T so as to be able to respond only on negative half cycles of the AC voltage across the secondary of transformer T. As with rectifiers SCR1 and SCR2, there are similar components to trigger each of the silicon-controlled rectifiers SCR3 and SCR4, namely, a respective capacitor C3 or C4, resistor R3 or R4, and diode D3 or D4, arranged similarly to corresponding components C1 and C2, R1 and R2, and D1 and D2.

Respective resistors R5, R6, R7, R8 provide load paths for the respective triggering circuit diodes D1, D2, D3 and D4, and respective parallel connected diodes D5, D6, D7 and D8 across the resistors R5, R6, R7 and R8 are optionally provided to suppress transient spikes.

In a typical circuit, as schematically shown at FIG. 4, wherein the secondary of transformer T delivers 60 Hz power at 20 volts R.M.S. the following component values and types are employed:

| | |
|---|---|
| R1 – R4 | 1 megohm |
| R5 – R8 | 22 K. ohms |
| C1 – 4 | .02 mfd |
| C5 | 70 mfd |
| D1 – 4 | 1N458 |
| D5 – 8 | 1N456 |
| SCR1 – SCR4 | Motorola Model No. MCR 406-4 |
| S1 – S4 | Dormeyer Industries Model No. 2786-M-1, modified |

To improve the action and response of the solenoids S1 – S4, the particular solenoid model indicated was modified in a prototype unit by removing the shading rings and doubling the number of residual springs, to more rapidly and more reliably break the residual magnetism of the core, i.e., to "unstick" the plunger. In addition, for the same purpose, epoxy soaked paper strips were adhered to the solenoid pole pieces to provide a minimum gap of about 0.005 inch.

To describe the operation of the circuitry of FIG. 4, let it be assumed that S1 is in the process of being pulsed by the positive half of the power wave from transformer T and that S2 is being blocked. The positive power wave acting through the capacitor C1 and diode D1 has just activated the trigger of SCR1 causing a power pulse to energize the solenoid S1. Through the rising part of the half wave, capacitor C1 continues passing current through the trigger of SCR1 by way of diode D1. This has the incidental effect of charging capacitor C1 substantially to the peak voltage of the power wave. When the peak voltage is reached, diode D1 prevents a reversal of the charge in capacitor C1, which charge discharges through the resistor R1 at a rate determined by the R1C1 time constant. In this case the time constant is selected to complete, essentially, the discharge of capacitor C1 by the time the second following positive half wave of T1 voltage occurs. During the first positive half wave, it has been assumed that the solenoid S2 is not pulsing but is carrying the triggering current for SCR1, which, however, will not be strong enough in terms of current flow to activate solenoid S2 or to result in an appreciable voltage drop across it.

During the negative half wave, the S1–S2 complex remains inactive. SCR1 and SCR2 are both quiescent, and diodes D1 and D2 prevent activity in the triggering network; however, C1 is still discharging through resistance R1. At the next following positive half wave, again, both SCR1 and SCR2 might be expected to fire; however the capacitor C1 is still partly charged, which prevents triggering of SCR1 during this half cycle. The inhibiting effect of this remnant charge causes a lag in the triggering response of SCR1 which cannot be overcome by the power wave until the wave has progressed fairly well into its positive half cycle. The triggering network of SCR2 has no such blockage and, therefore, SCR2 fires at the beginning of this positive half wave. This has the effect of creating a large voltage drop across solenoid S2, essentially bringing the input of the triggering network of SCR1 to a condition of not being powered. Since this takes place at the beginning of the positive half wave while SCR1 is being inhibited from firing, SCR1 does not fire during this entire positive half cycle of the power wave. This condition repeats the condition existing at the point of beginning of the sequential explanation, and the pulsing of the solenoids S1 and S2 will continue on alternate halves of the positive power wave as long as the power is supplied. The same operating sequence applies to solenoids S3 and S4, with polarity reversed, so that solenoids S3 and S4 are energized alternately on the negative half wave of the supplied power.

Capacitor C5, in series with the power supply, is for the purpose of power factor adjustment, neutralizing the inductive effect of the solenoid windings, thus markedly improving the power efficiency.

The value of capacitor C5 is selected to establish an essentially series resonance condition with the inductance of whichever load circuit comprises an energized solenoid, i.e., capacitor C5 is nominally in circuit with only one solenoid at a time, with each of the four solenoids S1–S4 energized sequentially and in such a way that the normal energy transfer is essentially a series resonance condition, with its attendant power efficiency. With a series resonance condition the power consumption in the circuit is only about 10% of the power which would be required if the pump drive were by conventional rotary motor means, i.e., about 20 watts as compared with about 200 watts for a like amount of water pumped and for energy utilization to flush the inlet screens and vibrate the unit. In selecting an appropriate value for capacitor C5 in a particular installation, the inductive effect of the secondary of transformer T can be considered negligible and the mean value of the inductance of each solenoid S is to be determined. In the instance of the component values set forth above as illustrative, each solenoid S1–S4 has a mean value of about 0.1 henry for pulse operation, it being also notable with respect to the inductance of the solenoid S that the instantaneous inductance changes sharply with change in position of the core or plunger, so that mean value is best determined on the basis of the effective inductance of the solenoid throughout its period of energization.

Capacitor C5 also serves the important function of blocking DC current flow in the secondary of transformer T; if C5 were not in the circuit the transformer T might, in some cases, become saturated and overheat, or solenoids S1–S4 would not be sequentially energized for essentially equal periods as desired.

As described previously herein, the sequential energization of the solenoids S1–S4 introduces a rotational component to the mechanical vibration of the measuring unit. Solenoids S1 and S2 are paired in one power unit 20 and pulsed as explained above, in alternate half waves. This amounts, in the case of a 60 Hz power supply, to a vibration rate of 30 Hz. Solenoids S3 and S4 are paired in the other power unit 20 and also pulsed at thirty Hz but in a different phase relationship, 90° displaced from the vibration of the first power unit 20. The net vectorial reaction of the combination is a mixture of translation and rotation of the housing 12 of the monitoring unit. As disclosed previously herein, this vibration of the outer housing 12 causes both monetary pressure changes and movement in shear with respect to the surrounding liquid, tending to markedly minimize the attachment of larvae of marine organisms to the outer surface of housing 12. At the same time, as disclosed previously, the vibrational movement of the solenoids produces a pumping action and a flushing of the inlet screens as described before.

The sequencing at a thirty Hz rate using sixty Hz power has the further advantage of introducing an interval between the powering of opposing members of the paired solenoid combination. This interval prevents oppositional power overlap which would otherwise be caused by the lagging inductive current, enabling the electrical current caused by the collapse of the magnetic fields of the solenoids to be returned to the power supply during a period of mechanical non-opposition, thus increasing the power efficiency.

In addition to the disclosed utility of the solenoid type pumping units and control circuitry for oceanographic monitoring purposes as above discussed, it will be apparent that pumping units and control circuitry of this type also have utility to function as the pumping means for a fresh water supply system, submerged in a well or the like. In such event, the back flushing feature can be eliminated, the four solenoid pump units are each provided with an inlet valve and are operated in series to increase pumping pressure, and the solenoid units need not necessarily be mounted in pairs, but can be mounted individually and each provided with a spring return in a manner conventional per se. With respect to the application of this type of unit to the pumping of fresh water in the domestic or industrial water supply field, it is to be noted that while solenoid actuated pump means heretofore have been considered impractical in this field because of relatively low power efficiency, the use of the power circuit of the present invention renders this type of pumping mechanism practical from the power efficiency point of view and the inherent simplicity, reliability and long life of such a unit offers very substantial advantages over conventional rotary motor pump units for the purpose.

As a circuit design alternative, it has been found advantageous in some instances to omit capacitor C5 from the circuit in that its omission removes a relatively expensive and bulky component from the circuit and also permits elimination of the power transformer.

With these components eliminated, lower voltages across the solenoid loads are realized for a given level of power consumption, and the circuitry is much more adaptable to miniaturization and encapsulation, e.g., within a pump housing in submerged pump applications, for example. A typical form of such a submerged pump apparatus involves four solenoid pumps pumping in series flow relationship and energized sequentially, with the solenoid pumps axially stacked within a cylindrical housing with a screened inlet at the bottom and with the pumped outflow delivered through a conduit extension connected to the upper end of the housing. In this apparatus the entire control circuit (such as in FIG. 4 less the transformer and capacitor C5) for energizing the pump solenoids is encapsulated into a suitable form for location within the housing such as in the form of an annular ring concentrically placed at the outflow end of the housing, with the two conductor AC power input to the circuit being led to the capsule through or within the wall of the outflow conduit.

One important operating characteristic of control circuits of the present invention is the relative efficiency thereof in terms of low energy loss by reason of the solenoid loads being connected across the effective AC power source through silicon controlled rectifiers. This is because, after a period of full current flow through a given solenoid, when the power source reverses polarity and polarity reverses across the solenoid, the collapsing magnetic field occurring from reduced current in the solenoid in turn induces continuing current flow through the SCR, with the energy of the collapsing field being returned to the line (i.e., the power source) rather than being dissipated. This relative efficiency is to be contrasted with other DC actuated solenoid type loads where energization of the solenoid is through mechanical switch means and substantial energy is lost in the spark across the switch contacts. In circuits of the present invention, the arrangement of SCRs in series with the solenoid loads permits use of an AC rather than DC power source, with the SCRs acting as rectifiers and providing DC energization of the solenoids, and with the SCRs advantageously functioning also to return the energy from the collapsing magnetic field of the solenoid to the power source.

Another potential usage of solenoid powered units with similar control circuitry is in the field of mechanical vibrators, such as used in vibration type particulate material handling systems, where solenoid type vibrator units can provide an efficient vibration source. In such a unit, the vibration frequency can be at line frequency or a sub-multiple of line frequency, or can be made variable as by providing a variable frequency power input and a variable series resonant capacitance so that the vibration frequency of the unit can be adjusted to coincide with the fundamental or a multiple or submultiple of the natural vibration frequency of the equipment vibrated.

As will be apparent, the control circuitry of the present invention can readily be designed to involve any even number of solenoid pump units, such as by incorporation of six solenoid units with each operated every third positive (or negative) half-cycle of the power input frequency, or such as by utilizing eight solenoid units with each operated every fourth positive (or negative) half cycle.

What is claimed is:

1. A circuit for distributing successive half waves of an alternating current power source to a plurality of loads, said circuit comprising:
    a. a plurality of electronic check valve means, each being connected in series with a respective load and connected to a source of alternating current power so that each check valve means passes current only during one set of either positive or negative half cycles of the alternating current,
    b. a plurality of gating means, each being connected to gate a respective check valve of one load and being operatively connected with another of said loads so as to receive its gating power therefrom, and
    c. a plurality of gating delay means, each operatively connected to a respective gating means and arranged to block operation thereof at least during the half cycle of power of like polarity following the half cycle on which the respective gating means operates to pass power to its associated load.

2. The circuit as recited in claim 1, wherein at least one of said gating delay means comprises a capacitive means and a discharge means associated with said capacitive means operative to discharge said capacitive means over a period of time equal to at least two half cycles of the alternating current power.

3. The circuit as recited in claim 2, wherein at least one of said gating delay means comprises capacitive means and resistance means connected in parallel.

4. The circuit as recited in claim 1, comprising diode means connected in series with each of said gating delay means.

5. The circuit as recited in claim 3, comprising diode means connected in series with each of said gating delay means.

6. The circuit as recited in claim 1, wherein each of said electronic check valve means comprises a silicon controlled rectifier.

7. The circuit as recited in claim 1, wherein two loads alternately energized during alternating current power half cycles of like polarity are respectively connected in series with respective electronic check valve means in the form of silicon controlled rectifier means, the triggering circuit for each of such silicon controlled rectifier means including gating delay means connected to the load associated with the other silicon controlled rectifier means.

8. The circuit as recited in claim 7, wherein each said gating delay means comprises parallel connected capacitor and resistor means and a diode means series connected thereto and to the trigger input of the associated silicon controlled rectifier means.

9. The circuit as recited in claim 8, comprising four loads, sequentially energized.

10. The circuit as recited in claim 9, wherein said loads are solenoids.

11. The circuit as recited in claim 1, comprising:
    a. a plurality of second check valve means, each being connected in series with a respective load and adapted to be connected to a source of alternating current power so as to pass current only on the other set of either positive or negative half cycles of the alternating current power,
    b. a plurality of second gating means, each being connected to gate a respective one of said second check valve means of one load, and being connected with another of said loads to receive its gating power therefrom, and c. a plurality of second gating delay means, each being operatively connected to a respective one of said second gating means and arranged to delay operation thereof for at least a succeeding half cycle of said other half cycle set after operation of the related second gating means on a previous half cycle of said other half cycle set.

* * * * *